US010368265B2

(12) United States Patent
Zhang et al.

(10) Patent No.: US 10,368,265 B2
(45) Date of Patent: *Jul. 30, 2019

(54) ENHANCED MECHANISM OF BUFFER STATUS REPORTING TO MULTIPLE SCHEDULERS IN A WIRELESS NETWORK

(71) Applicant: HFI Innovation Inc., Hsinchu County (TW)

(72) Inventors: Yuanyuan Zhang, Beijing (CN); Chia-Chun Hsu, New Taipei (TW)

(73) Assignee: HFI Innovation INC., HsinChu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/662,693

(22) Filed: Jul. 28, 2017

(65) Prior Publication Data

US 2017/0325121 A1 Nov. 9, 2017

Related U.S. Application Data

(63) Continuation of application No. 14/804,461, filed on Jul. 21, 2015, now Pat. No. 9,756,523, which is a (Continued)

(30) Foreign Application Priority Data

May 17, 2013 (CN) .......................... 2013 1 0184746

(51) Int. Cl.
*H04W 28/02* (2009.01)
*H04W 72/12* (2009.01)
*H04W 88/02* (2009.01)

(52) U.S. Cl.
CPC ... *H04W 28/0278* (2013.01); *H04W 72/1284* (2013.01); *H04W 88/02* (2013.01)

(58) Field of Classification Search
CPC .................. H04W 28/0278; H04W 72/1284
See application file for complete search history.

(56) References Cited

U.S. PATENT DOCUMENTS

2009/0052420 A1* 2/2009 Fischer .................. G08C 17/02
370/338
2010/0150082 A1 6/2010 Shin et al. ................... 370/329
(Continued)

FOREIGN PATENT DOCUMENTS

CN 102356612 A 2/2009
CN 101925128 A 6/2009
(Continued)

OTHER PUBLICATIONS

International Search Report and Written Opinion of International Search Authority for PCT/CN2014/077650 dated May 16, 2014(12 pages).

(Continued)

*Primary Examiner* — Gary Mui
(74) *Attorney, Agent, or Firm* — Imperium Patent Works; Helen Mao

(57) ABSTRACT

Apparatus and method are provided to enhance buffer status report (BSR) to multiple schedulers with inter base station carrier aggregation. In one novel aspect, the UE calculates a buffer size value, detects a BSR trigger event, selects one or more base stations (BSs) to send the BSR reports and generates the BSR reports for the selected one or more BSs. In one embodiment, one BS is selected based on predefined criteria. In other embodiments, multiple base stations are selected. In one embodiment, the same contents for BSR are generated. In another embodiment, different BSR reports are generated for different base stations from which the UE receives UL grants. In one novel aspect, the UE calculates a buffer size value and determines if a budget BSR triggering criteria is satisfied. The UE triggers budget BSR procedure (Continued)

by sending a budget BSR report to a selected base station based on predefined thresholds.

17 Claims, 10 Drawing Sheets

Related U.S. Application Data continuation of application No. PCT/CN2014/077650, filed on May 16, 2014.

(56) References Cited

U.S. PATENT DOCUMENTS

| | | | |
|---|---|---|---|
| 2010/0232385 A1 | 9/2010 | Hsu | 370/329 |
| 2011/0255492 A1 | 10/2011 | Dai et al. | 370/329 |
| 2011/0305290 A1 | 12/2011 | Kim et al. | 375/267 |
| 2011/0310937 A1 | 12/2011 | Lin et al. | 375/219 |
| 2012/0099452 A1 | 4/2012 | Dai et al. | 370/252 |
| 2013/0322339 A1 | 12/2013 | Ohta et al. | 370/328 |
| 2014/0092865 A1 | 4/2014 | Heo et al. | 370/331 |
| 2015/0230235 A1 | 8/2015 | Uchino et al. | 370/329 |
| 2015/0244429 A1 | 8/2015 | Zhang et al. | 370/329 |
| 2015/0327116 A1 | 11/2015 | Zhang et al. | 370/329 |
| 2017/0086093 A1* | 3/2017 | Chen | H04W 72/1284 |
| 2019/0058570 A1* | 2/2019 | Zhang | H04L 5/0098 |

FOREIGN PATENT DOCUMENTS

| | | |
|---|---|---|
| CN | 101932019 A | 6/2009 |
| CN | 102364984 A | 6/2010 |
| EP | 2566271 | 12/2008 |
| EP | 2421313 | 6/2009 |
| EP | 2445279 A1 | 10/2010 |
| WO | WO2011160283 A1 | 6/2010 |
| WO | WO2012108046 A1 | 2/2011 |

OTHER PUBLICATIONS

SIPO, search report for the CN patent application 201480028802.1 (no English translation is available) dated Jan. 30, 2018 (9 pages).
SIPO, search report for the CN patent application 201480028802.1 (no English translation is available) dated Oct. 9, 2018 (13 pages).

* cited by examiner

ENHANCED MECHANISM OF BUFFER STATUS REPORTING TO MULTIPLE SCHEDULERS IN A WIRELESS NETWORK

CROSS REFERENCE TO RELATED APPLICATIONS

This application is a continuation, and claims priority under 35 U.S.C. § 120 from nonprovisional U.S. patent application Ser. No. 14/804,461, entitled "Enhanced Mechanism of Uplink Time Alignment Maintenance for Inter-eNB Carrier Aggregation", filed on Jul. 21, 2015, the subject matter of which is incorporated herein by reference. Application Ser. No. 14/804,461, in turn, is a continuation, and claims priority under 35 U.S.C. § 120 and § 365(c) from International Application No. PCT/CN2014/077650, with an international filing date of May 16, 2014, which in turn claims priority from CN Application Number CN201310184746.8, entitled "Enhanced Mechanism of Buffer Status Reporting to Multiple Schedulers in a Wireless network with Inter Base Station Carrier Aggregation" filed on May 17, 2013. This application claims the benefit under 35 U.S.C. § 119 from Chinese Application CN201310184746.8. The disclosure of each of the foregoing documents is incorporated herein by reference.

TECHNICAL FIELD

The disclosed embodiments relate generally to wireless communication systems, and, more particularly, to enhanced mechanism of Buffer Status Report reporting to multiple schedulers with inter-base station carrier aggregation.

BACKGROUND

A Long-Term Evolution (LTE) system offers high peak data rates, low latency, improved system capacity, and low operating cost resulting from simplified network architecture. LTE systems also provide seamless integration to older wireless network, such as GSM, CDMA and Universal Mobile Telecommunication System (UMTS). In LTE systems, an evolved universal terrestrial radio access network (E-UTRAN) includes a plurality of base stations, e.g., evolved Node-Bs (eNBs) communicating with a plurality of mobile stations referred as user equipments (UEs).

A Buffer status report (BSR) is sent from the UE to the serving eNB to provide information about the amount of pending data in the uplink buffer of the UE. The buffer status, along with other information, such as priorities allocated to different logical channels, is useful for the uplink scheduling process to determine which UEs or logical channels should be granted radio resources at a given time. The UE communicates the BSR to the scheduler in the base station so that the base station has sufficient information about the data waiting in the UE for UL transmission. The base station can allocate appropriate UL resource for the UE in a timely manner. Traditionally, the UE reports the buffer status to only one base station, which is its serving base station. This method encounters problem with the use of inter-base station carrier aggregation.

Carrier aggregation (CA) is introduced to improve system throughput. With carrier aggregation, the LTE-Advance system can support higher data rate. Such technology is attractive because it allows operators to aggregate several smaller contiguous or non-continuous component carriers (CC) to provide a larger system bandwidth, and provides backward compatibility by allowing legacy users to access the system by using one of the component carriers. LTE also allows carrier aggregation from different eNBs or from different radio access technology (RAT). Different from the traditional wireless system, with inter-eNB or inter-RAT carrier aggregation, the UE needs to associate with multiple schedulers from different base stations. For inter-BS carrier aggregation, the base stations providing the carrier components are not physically collocated, it requires transmission medium and interfaces among the base stations. Therefore, the UE has to provide separate BSRs to different schedulers residing in different base stations.

Improvements and enhancements are required for UE BSR procedures to communicate and manage multiple schedulers from different base stations.

SUMMARY

Apparatus and method are provided to enhance buffer status report (BSR) to multiple schedulers with inter base station carrier aggregation. In one novel aspect, the UE calculates a buffer size value, detects a BSR trigger event. The UE selects one or more base stations (BSs) to send the BSR reports and generates the BSR reports for the selected one or more BSs. In one embodiment, one BS is selected based on predefined criteria. In other embodiments, multiple base stations are selected to receive BSR reports. In one embodiment, the same contents for BSR are generated for all base stations from which the UE receives UL grants. In another embodiment, different BSR reports are generated for different base stations from which the UE receives UL grants.

In one novel aspect, a budget BSR procedure is triggered upon detecting one or more predefined budget BSR triggering events. In one embodiment, the UE calculates a buffer size value. The UE determines if a budget BSR triggering criteria is satisfied. The UE triggers budget BSR procedure by sending a budget BSR report to a selected base station based on predefined thresholds.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
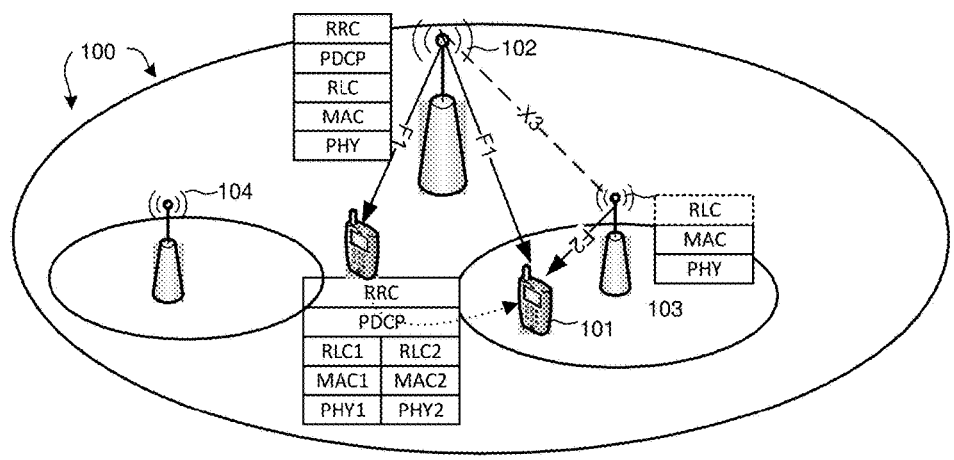
FIG. 1 illustrates a system diagram of a wireless network with inter-eNB or inter-RAT carrier aggregation in accordance with one novel aspect.

FIG. 1 illustrates a system diagram of a wireless network 100 with inter-eNB or inter-RAT carrier aggregation in accordance with one novel aspect. Wireless network 100 comprises a main base station eNB, also referred as an anchor eNB 102, two drifting eNBs 103 and 104 and a UE 101. Wireless network 100 supports multiple component carriers over different frequency channels, and carrier aggregation for serving cells originated from different eNBs. For uplink (UL) synchronization between a UE and its base station with respect to each component carrier (CC), the UE receives an UL timing advance from the eNB, which compensates for the propagation delay between the eNB and the UE. Since UE 101 can be served with radio resources from eNB 102, eNB 103 and eNB 104, it may need to send BSR to one or more of the serving cells in wireless 100. Wireless network 100 can be an inter-RAT CA network, with the anchor eNB 102 employs one technology, for example, LTE or other cellular standards, while drift eNBs 103 and 104 using different wireless standards, such as Wifi. Regardless of the inter-BS CA using the same standard or different standard, UE 101 is configured to associate with different schedulers in each of the base stations, eNB 102, eNB 103 and eNB 104. Upon detecting a BSR triggering event, UE 101 needs to decide to which base station the BSR should be sent. The UE also need to decide how to build the one or more BSRs.

In one exemplary configuration, wireless network 100 is a small cell network. Initially, UE 101 camps on the macro cell served by eNB 102. UE 101 establishes Radio Resource Control (RRC) connection with the Radio Access Network (RAN). eNB 102 provides and controls the initial RRC connection and provides NAS mobility information and security input. eNB 102 is the anchor eNB for UE 101. In a small cell network configuration, UE 101 moves within the coverage area of anchor eNB 102 while moving into the coverage area of eNB 103. Upon entering eNB 103 coverage area, UE 101 can offload some traffic to eNB 103 if needed. In such situation, inter-eNB carrier aggregation can be configured for UE 101. UE 101 can use additional resources from eNB 103, which is a drift eNB in the small cell network system. The coordination between anchor eNB 102 and drift eNB 103 can be performed through Xn interface, for example, X3 or X2 interface. The Xn interfaces, also known as backhaul connections provide communication and coordination between eNBs. However, heavy reliance on such interface introduces undesirable delays for the system.

FIG. 1 also includes simplified block diagrams of protocol stacks in small cell network 100 for anchor eNB 102, drift eNB 103 and UE 101. At network side, the protocol stack in anchor eNB 102 includes PHY, MAC, RLC, PDCP, RRC, and a scheduler. Because drift eNB 103 has its own independent scheduler, the protocol stack in eNB 103 includes at least PHY, MAC, and a scheduler, and possible RLC too. At UE side, for UEs equipped with multiple PHY and MAC modules, they can be configured based on its usage for carrier aggregation and small cell operation. In one novel aspect of the current invention, UE 101 has multiple RLC layers with corresponding MAC layers associated with corresponding PHY layer. In one embodiment, UE 101 is equipped with RLC1 corresponding to MAC1 and established RRC connection with anchor eNB 102. As UE 101 moves into the coverage area of eNB 103, the network may decide to aggregation resources from eNB 103 to offload traffics from UE 101. Therefore, UE 101 is also configured with RLC2 corresponding to MAC2, and the corresponding PHY sub-layer, which is PHY2.

Figure 2:
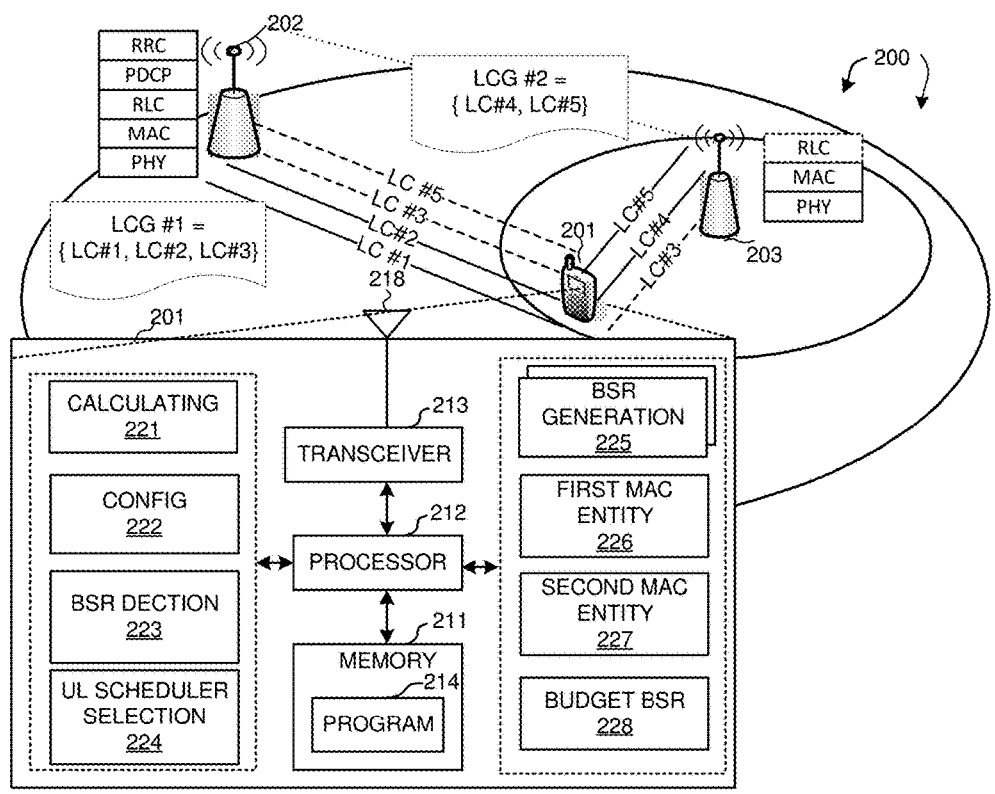
FIG. 2 is an exemplary flow diagram of a UE transmitting one or more BSRs to different base station in accordance with embodiments of the current invention.

FIG. 2 is a schematic diagram of a wireless network 200 that supports inter-eNB carrier aggregation with different cell groups configured for a UE 201 in accordance with embodiments of the current invention. UE 201 establishes RRC connection with anchor eNB 202. Network 200 supports inter-eNB or inter-RAT carrier aggregation. UE 201 is configured with inter-eNB carrier aggregation. When UE 201 moves into the coverage area of eNB 203, UE 201 can be configured with inter-eNB carrier aggregation. UE 201 can offload traffic from eNB 202 to eNB 203. UE 201 can be configured with multiple serving cells originated from two different eNBs, for example eNB 202 and eNB 203. UE 201 is configured with multiple LCs, for example, LC #1 to LC #5. UE 201 is also configured with multiple logical channel groups (LCGs). LC #1 is configured for UE 201 and is associated with eNB 202. Similarly, LC #2 is associated with eNB 202, and LC #5 is associated with eNB 203. LC #3 is configured to be able to associate with eNB 202 or eNB 203. Similarly, LC #5 is configured to be able to associate with eNB 202 and eNB 203. Multiple LCGs are configured for UE 201. LCG #1 contains LC #1, LC #2 and LC #3. LCG #2 contains LC #4 and LC #5. Such configuration gives UE 201 larger bandwidth and more flexibility in aggregating resource but it poses a set of UL resource management issues. For example, upon detecting a BSR triggering event, the UE has to decide how to which eNB or eNBs the BSR reports should be sent. The UE also need to decide how to build the one or more BSR reports for each selected eNB.

FIG. 2 also includes a simplified block diagram of UE 201 in accordance with novel aspects of the current invention. UE 201 comprises memory 211, a processor 212, a transceiver 213 coupled to an antenna 218. UE 201 also comprises various function modules including a calculating module 221, a configuration module 222, a BSR detection module 223, an UL scheduler selection module 224, one or BSR generation modules 225, a first MAC entity module 226, a second MAC entity module 227 and a budget BSR module 228. Calculating module 221 calculates a buffer status value, which can be used to build the BSR reports to be sent to one or more selected base stations. Configuration module 222 configures LCs of UE 201 to one or more LCGs accordingly. Configuration module 222 configures LCs either binding to a specific base station via a specific MAC entity, or configures LCs to no specific base stations. BSR detection module 223 monitors and detects BSR triggering events. UL scheduler selection module 224, upon receiving BSR triggering events, selects one or more UL schedulers to send the BSR based on predefined algorithms. BSR generation module 225 generates BSR reports to be sent to the selected one or more UL schedulers. UE 201 may have one or more BSR generation modules. In one embodiment, each MAC entity has its own BSR generation module handling BSR report to its corresponding scheduler. In another embodiment, UE 201 has one BSR generation module for all MAC entities. In yet another embodiment, UE 201 has one BSR generation handling a set of predefined BSR triggers for all MAC entities, and other BSR generation modules for each MAC entity for a different set of predefined BSR triggers. First MAC entity 226 communicates with a first base station. Second MAC entity 227 communicates with a second base station. It is understood by one with ordinary skills in the art that more than two MAC entities can be included in UE 201 when configured. Budget BSR module 228 processes budget BSR according to predefined algorithms.

Figure 3:
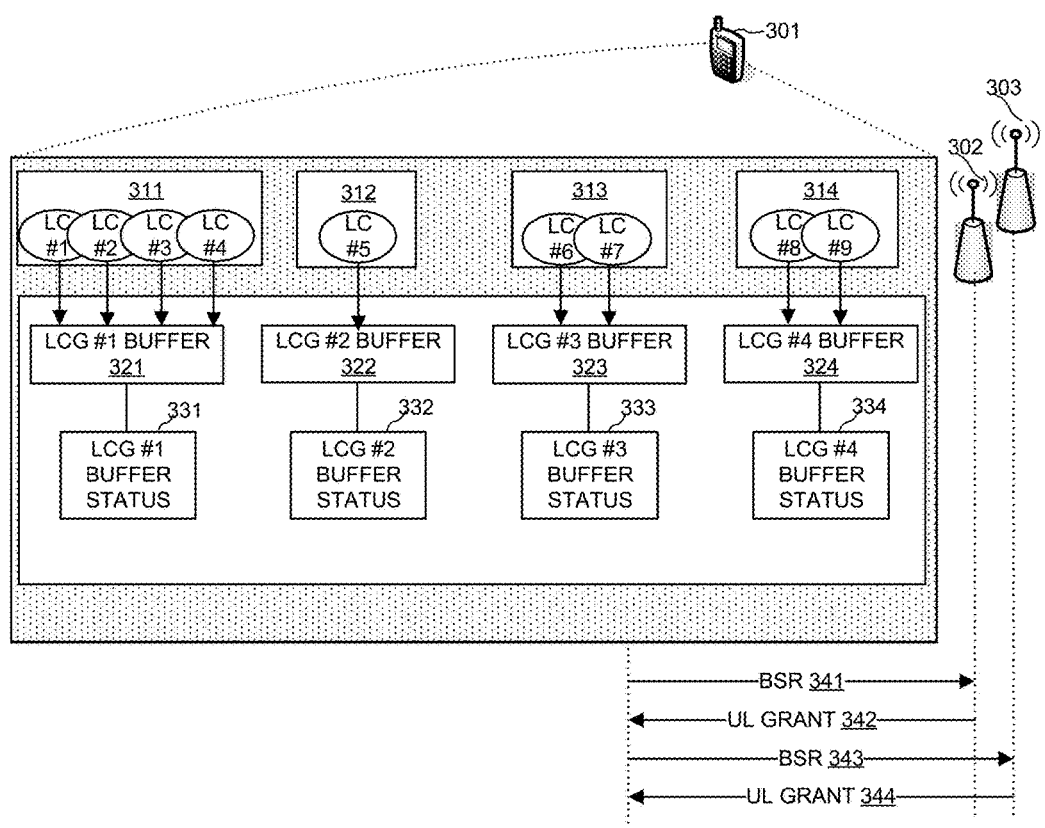
FIG. 3 is an exemplary diagram of a UE transmitting BSR reports to different base stations.

FIG. 3 is an exemplary diagram of a UE 301 transmitting BSR reports to different base stations. UE 301 communicates with base station BS 302 and base station BS 303. BS 302 and BS 303 allocate UL resources for UE 301. UE 301 sends BSR reports to BS 302 and/or BS 303. In one transmission time interval (TTI), if UE 301 only receives one UL grant from BS 302 or BS 303, UE 301 transmits one BSR report to one of the base stations. If UE 301 receives multiple UL grants in one TTI, UE 301 may transmit multiple BSRs to the base station. UE 301 has multiple logical channels (LC), LC#1 to LC#9, divided into a plurality of logical channel groups (LCGs), LCG 311, 312, 313 and 314. Each LCG has one or more LCs, or no LC. As an example shown in FIG. 3, LCG 311 has four LCs, LC#1, LC#2, LC#3 and LC#4. LCG 312 has one LC, LC#5. LCG 313 has two LCs, LC#6 and LC#7. LCG 314 has two LCs, LC#8 and LC#9. Each LCG has a corresponding LCG buffer. LCG 311 has LCG#1 buffer 321. LCG 312 has LCG#2 buffer 322. LCG 313 has LCG#3 buffer 323. LCG 314 has LCG#4 buffer 324. Further, each LCG buffer has a corresponding buffer status. LCG buffer 321 has LCG#1-buffer status 331. LCG buffer 322 has LCG#2-buffer status 332. LCG buffer 323 has LCG#3-buffer status 333. LCG buffer 324 has LCG#4-buffer status 334.

Due to inter-base station carrier aggregation, UE 301 may receive multiple UL grants from one or multiple base stations. If UE 301 receives multiple UL grants from one base station in one TTI, either BS 302 or BS 303, each LCG shall report at most one BSR value per TTI to the BS. This buffer status value shall be reported in BSR associated with this LCG. If UE 301 receives multiple UL grants by both BS 302 and BS 303 in one TTI, UE 301 can transmit multiple BSRs to either one BS or multiple BSs. Each LCG can report the same buffer status value to all BSs or report different buffer status values to different BSs. Though each LCG can report different buffer status values to different BSs, UE 301 can only report one buffer status value per TTI to the same BS and this value shall be reported in all BSRs for this LCG.

UE 301 monitors and detects BSR trigger events. At step 341, UE 301 sends a BSR to BS 302. At step 342, BS 302 replies to UE 301 with UL grants. At step 343, UE 301 sends a BSR to BS 303. At step 344, BS 303 replies to UE 301 with UL grants.

Figure 4:
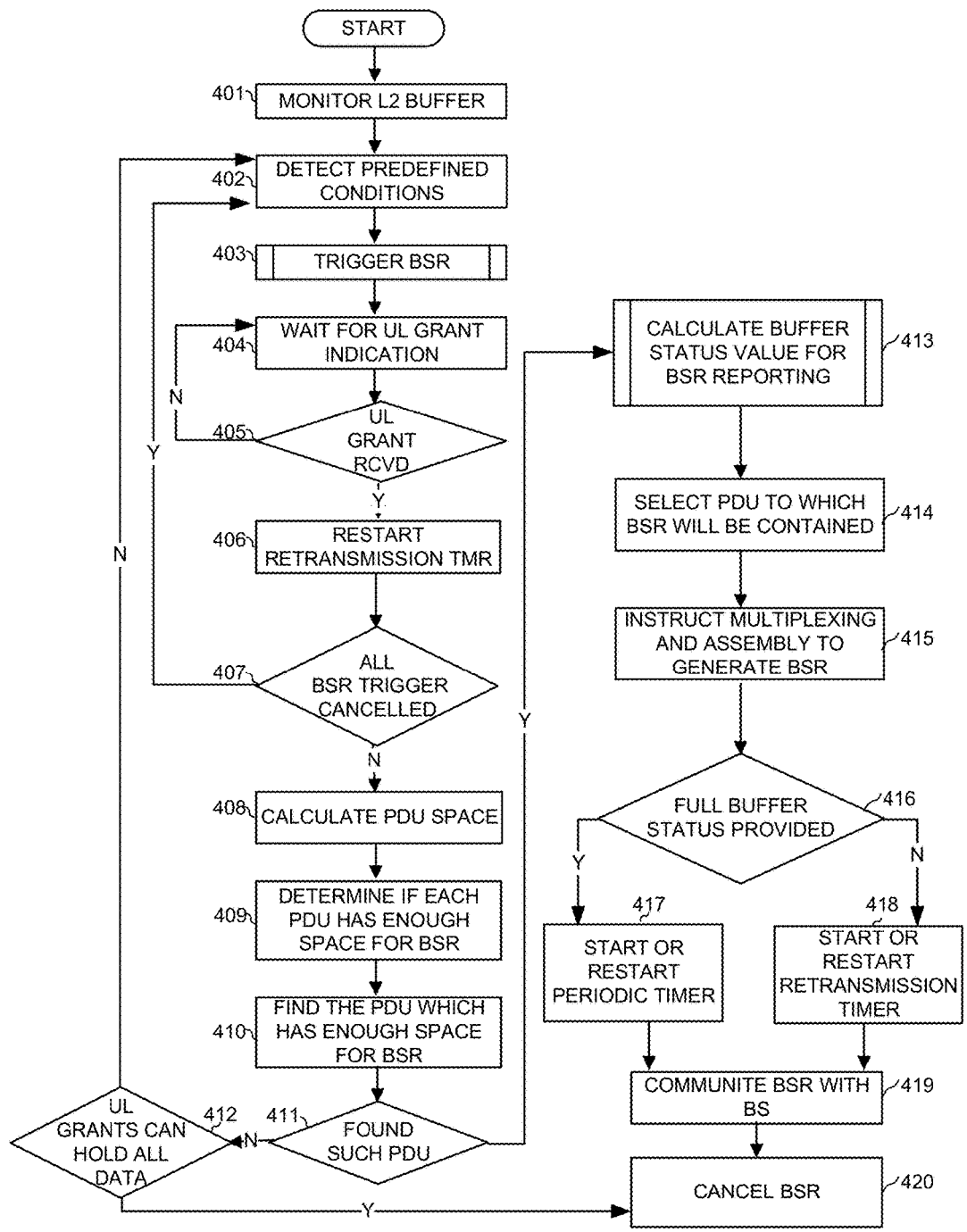
FIG. 4 is an exemplary flow diagram of a UE transmitting one or more BSRs to different base station in accordance with embodiments of the current invention.

FIG. 4 is an exemplary flow diagram of a UE transmitting one or more BSRs to a different base station in accordance with embodiments of the current invention. At step 401, the UE monitors layer two buffers. At step 402, the UE detects predefined conditions. At step 403, the UE detects one or more BSR trigger events. At step 404, the UE waits for one or more UL grants indications. At step 405, the UE checks if at least one UL grant is received. If step 405 determines that no UL grant is received, the UE goes back to step 402 to detect predefined conditions. If step 405 determines that one or more UL grants are received, the UE moves to step 406. At step 406, the UE restarts the BSR retransmission timer. At step 407, the UE checks if all the BSR triggers are cancelled. If step 407 finds that all BSR triggers are cancelled, the UE goes back to step 402 to detect predefined conditions. If step 407 finds that there are one or more BSR triggers not cancelled, the UE moves to step 408. At step 408, the UE calculates the available space of transmitting protocol data units (PDUs). At step 409, the UE determines if the available space of transmitting PDUs has enough space for BSR. At step 410, the UE finds the PDUs that have enough for BSR. At step 411, the UE determines if it finds the PDU that met the requirements. If step 411 determines the UE cannot find the required PDUs, it moves to step 412. At step 412, the UE determines if the UL grants can hold all data. If step 412 determines that the UL grants can hold all data, the UE moves to step 420, which cancels BSR and end the procedure. If step 412 determines that the UL grants cannot hold all data, the UE moves back to step 402 to detect predefined conditions. If step 411 finds required PDU, the UE moves step 413. At step 413, the UE calculates a buffer status value for the BSR reporting. At step 414, the UE selects the PDUs that would contain the BSR. At step 415, the UE instructs multiplexing and assembly process to generate a BSR. At step 416, the UE determines if the generated BSR can provide full buffer status information. If step 416 determines yes, the UE moves to step 417 and starts or restarts the BSR periodic timer. If step 416 determines no, the UE moves to step 418 and starts or restarts the BSR retransmission timer. At step 419, the UE communicates the generated BSR to the BS. At step 420, the UE cancels BSR and ends the procedure.

To handle inter-base station carrier aggregation, multiple MAC entities are configured for a UE. In general, each MAC entity in the UE corresponds to a base station that the UE is associated. In one embodiment, the BSR functions are performed independently of MAC entities. The UE has one BSR functional block that controls each MAC entity for the BSR procedure. In another embodiment, each MAC entity has its own function entity for the BSR procedure. In yet another embodiment, the UE has hybrid BSR entities. The UE is configured with an independent BSR entity handling one set of predefined BSR trigger events. At the same time, each MAC entity of the UE also has its own BSR entity handling a separate set of BSR trigger events. The following section describes the above embodiments in details.

Joint BSR

Figure 5:
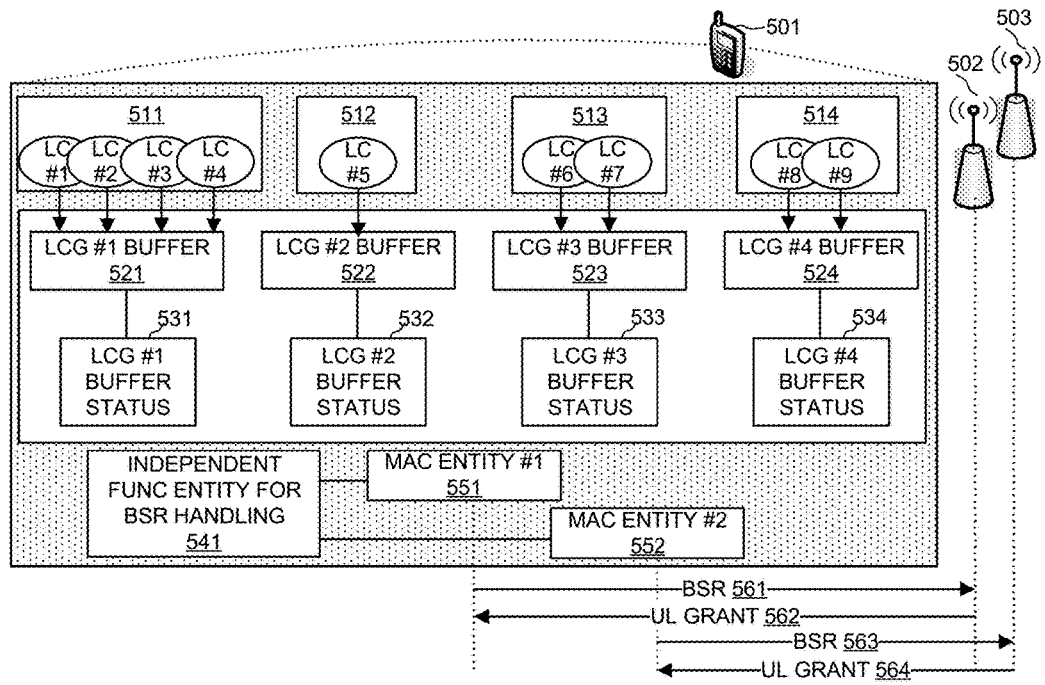
FIG. 5 is a schematic diagram of a UE transmitting BSR to multiple base stations by joint BSR in accordance with embodiments of the invention.

FIG. 5 is a schematic diagram of a UE 501 transmitting BSRs to multiple base stations by joint BSR in accordance with embodiments of the invention. UE 501 communicates with base station BS 502 and base station BS 503. BS 502 and BS 503 allocate UL resources for UE 501. UE 501 sends BSR reports to BS 502 and/or BS 503. UE 501 has multiple logical channels (LC), LC#1 to LC#9, divided into a plurality of logical channel groups (LCGs), LCG 511, 512, 513 and 514. Each LCG has one or more LCs, or no LC. As an example shown in FIG. 5, LCG 511 has four LCs, LC#1, LC#2, LC#3 and LC#4. LCG 512 has one LC, LC#5. LCG 513 has two LCs, LC#6 and LC#7. LCG 514 has two LCs, LC#8 and LC#9. Each LCG has a corresponding LCG buffer. LCG 511 has LCG#1 buffer 521. LCG 512 has LCG#2 buffer 522. LCG 513 has LCG#3 buffer 523. LCG 514 has LCG#4 buffer 524. Further, each LCG buffer has a corresponding buffer status. LCG buffer 521 has LCG#1-buffer status 531. LCG buffer 522 has LCG#2-buffer status 532. LCG buffer 523 has LCG#3-buffer status 533. LCG buffer 524 has LCG#4-buffer status 534. An independent function entity for BSR handling 541 of UE 501 handles BSR procedures for UE 501. BSR handler 541 controls a MAC entity 551 and a MAC entity 552, which are associated to BS 502 and BS 503, respectively. It is understood by one of ordinary skills in the art that more two MAC entities can be configured to communicate with multiple base stations. BSR handler 541 controls the multiple MAC entities in similar manners.

In the joint BSR configuration, a periodic timer(periodicBSR-Timer), and a retransmission timer(retxBSR-Timer) is used by BSR handler 541 to control the BSR reporting behavior and to avoid the deadlock. If the UL resources allocated for new transmission are granted from any BS, the BSRs triggered by BSR handler 541 are considered. If the UL grants in the current subframe can accommodate all pending data available for transmission but are not sufficient to accommodate the BSRs, all triggered BSR by BSR handler 541 shall be cancelled. UE 501 monitors and detects BSR trigger events. If BSR handler 541 determines BSR reporting is needed, at step 561, UE 501 sends a BSR to BS 502. At step 562, BS 502 replies to UE 501 with UL grants. At step 563, UE 501 sends a BSR to BS 503. At step 564, BS 503 replies to UE 501 with UL grants.

Separate BSR

Figure 6:
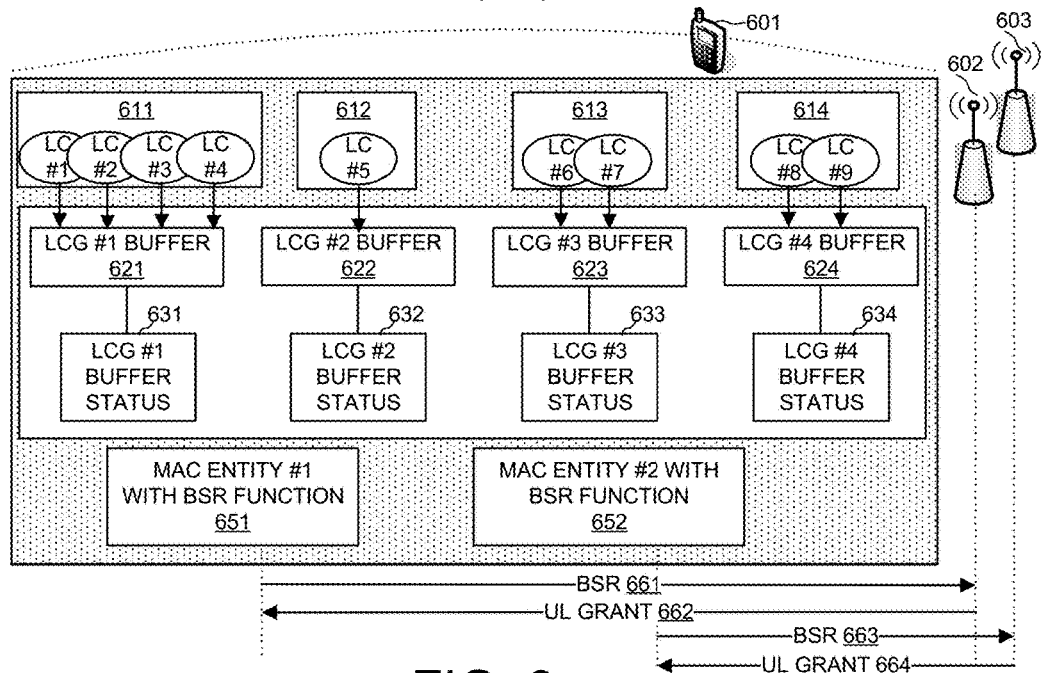
FIG. 6 is a schematic diagram of a UE transmitting BSR to multiple base stations by separate BSR in accordance with embodiments of the invention.

FIG. 6 is a schematic diagram of a UE 601 transmitting BSRs to multiple base stations by separate BSR in accordance with embodiments of the invention. UE 601 communicates with base station BS 602 and base station BS 603. BS 602 and BS 603 allocate UL resources for UE 601. UE 601 sends BSR reports to BS 602 and/or BS 603. UE 601 has multiple logical channels (LC), LC#1 to LC#9, divided into a plurality of logical channel groups (LCGs), LCG 611, 612, 613 and 614. Each LCG has one or more LCs, or no LC. As an example shown in FIG. 6, LCG 611 has four LCs, LC#1, LC#2, LC#3 and LC#4. LCG 612 has one LC, LC#5. LCG 613 has two LCs, LC#6 and LC#7. LCG 614 has two LCs, LC#8 and LC#9. Each LCG has a corresponding LCG buffer. LCG 611 has LCG#1 buffer 621. LCG 612 has LCG#2 buffer 622. LCG 613 has LCG#3 buffer 623. LCG 614 has LCG#4 buffer 624. Further, each LCG buffer has a corresponding buffer status. LCG buffer 621 has LCG#1-buffer status 631. LCG buffer 622 has LCG#2-buffer status 632. LCG buffer 623 has LCG#3-buffer status 633. LCG buffer 624 has LCG#4-buffer status 634. A MAC entity 651 and a MAC entity 652 communicate with BS 602 and BS 603, respectively. MAC entity 651 and MAC entity 652 also have their own BSR handling functions. It is understood by one of ordinary skills in the art that more two MAC entities can be configured to communicate with multiple base stations. Each of the multiple MAC entities has similar functions as MAC entity 651 and MAC entity 652.

In the separate BSR configuration, a periodic timer(periodicBSR-Timer), and a retransmission timer(retxBSR-Timer) is used by MAC entity 651 and MAC 652 to control the BSR reporting behavior, for example, to avoid the deadlock. If the UL resources allocated for new transmission are granted from any BS, each MAC entity checks its corresponding BSRs to determine whether the triggered BSRs should be cancelled. If the UL grants in the current subframe can accommodate all pending data available for transmission but are not sufficient to accommodate the BSRs, the BSRs triggered by the corresponding MAC entity should be cancelled while the BSRs triggered by other MAC entities should not be affected. UE 601 monitors and detects BSR trigger events. If MAC entity 651 determines BSR reporting is needed, at step 661, UE 601 sends a BSR to BS 602. At step 662, BS 602 replies to UE 601 with UL grants. If MAC entity 652 determines BSR reporting is needed, at step 663, UE 601 sends a BSR to BS 603. At step 664, BS 603 replies to UE 601 with UL grants.

When the UE is configured with either joint BSR or separate BSR, a BSR shall be triggered either by the independent BSR handler, such as BSR handler 541, or by BSR functions in each MAC entity, such as MAC entity 651 or MAC entity 652. The UE triggers the BSR process when any predefined condition is detected. The predefined conditions may include the arrival of higher priority data, the expiration of the BSR retransmission timer, the expiration of the BSR periodic timer and padding spaces being available to accommodate the BSR.

Figure 7:
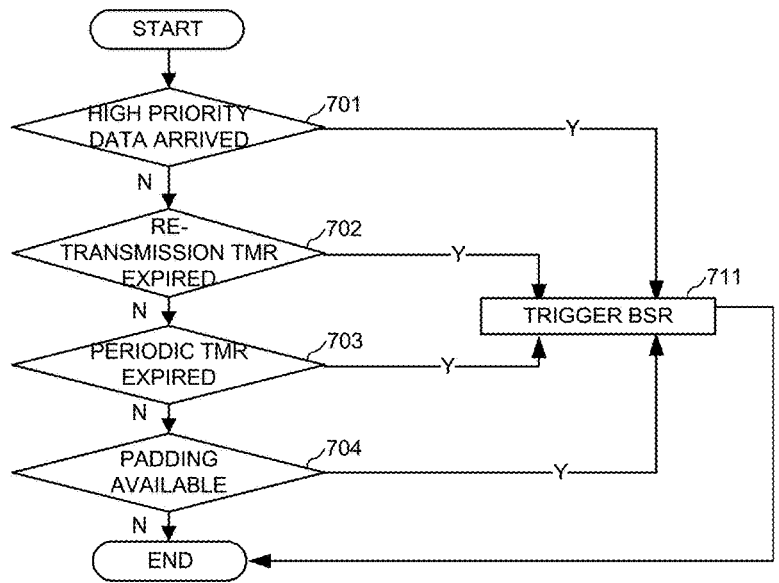
FIG. 7 is a flow diagram of a UE transmitting BSR to multiple base stations using separate or joint BSR.

FIG. 7 is a flow diagram of a UE transmitting BSR to multiple base stations using separate or joint BSR. At step 701, the UE determines if high priority data arrived. If step 701 determines yes, the UE moves to step 711 to set the BSR trigger. If step 701 determines no, the UE moves to step 702. At step 702, the UE determines if the BSR retransmission timer expired. If step 702 determines yes, the UE moves to step 711 to set the BSR trigger. If step 702 determines no, the UE moves to step 703. At step 703, the UE determines if the BSR periodic timer expired. If step 703 determines yes, the UE moves to step 711 to set the BSR trigger. If step 703 determines no, the UE moves to step 704. At step 704, the UE determines is there is padding space available to accommodate the BSR. If step 704 determines yes, the UE moves to step 711 to set the BSR trigger. If step 704 determines no, the UE terminates the procedure.

Hybrid BSR

Figure 8:
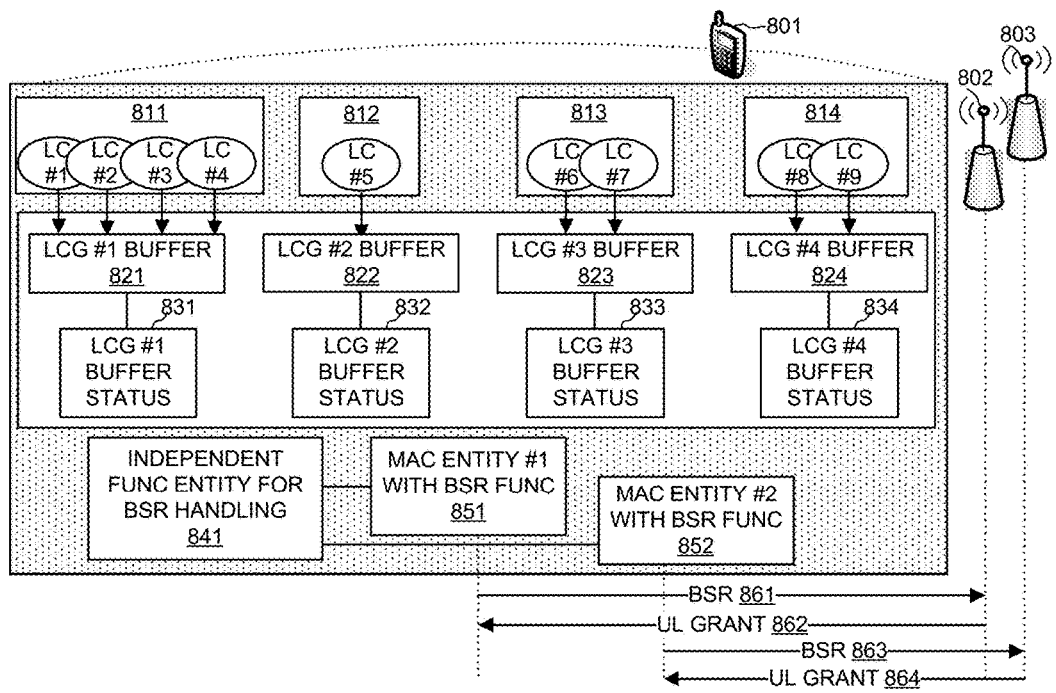
FIG. 8 is a schematic diagram of a UE transmitting BSR to multiple base stations by hybrid BSR in accordance with embodiments of the invention.

FIG. 8 is a schematic diagram of a UE 801 transmitting BSR to multiple base stations by hybrid BSR in accordance with embodiments of the invention. UE 801 communicates with base station BS 802 and base station BS 803. BS 802 and BS 803 allocate UL resources for UE 801. UE 801 sends BSR reports to BS 802 and/or BS 803. UE 801 has multiple logical channels (LC), LC#1 to LC#9, divided into a plurality of logical channel groups (LCGs), LCG 811, 812, 813 and 814. Each LCG has one or more LCs, or no LC. As an example shown in FIG. 8, LCG 811 has four LCs, LC#1, LC#2, LC#3 and LC#4. LCG 812 has one LC, LC#5. LCG 813 has two LCs, LC#6 and LC#7. LCG 814 has two LCs, LC#8 and LC#9. Each LCG has a corresponding LCG buffer. LCG 811 has LCG#1 buffer 821. LCG 812 has LCG#2 buffer 822. LCG 813 has LCG#3 buffer 823. LCG 814 has LCG#4 buffer 824. Further, each LCG buffer has a corresponding buffer status. LCG buffer 821 has LCG#1-buffer status 831. LCG buffer 822 has LCG#2-buffer status 832. LCG buffer 823 has LCG#3-buffer status 833. LCG buffer 824 has LCG#4-buffer status 834. An independent function entity for BSR handling 841 of UE 801 handles BSR procedures for UE 801. BSR handler 841 controls a MAC entity 851 and a MAC entity 852, which are associated to BS 802 and BS 803, respectively. MAC entity 851 and MAC entity 852 each has its own BSR handling functions. It is understood by one of ordinary skills in the art that more two MAC entities can be configured to communicate with multiple base stations. BSR handler 541 controls the multiple MAC entities in similar manners.

In the hybrid BSR configuration, a retransmission timer is used by BSR handler 841 to control the BSR reporting behavior. At the same time, MAC entity 851 and MAC 852 is configured with a periodic timer. The value of the periodic timer for each MAC entity can be configured and/or dynamic changed. The periodic timer for each MAC entity can be the same or different. If the UL resources allocated for new transmission are granted from any BS, all BSR triggers, either by BSR handler 841 or by each MAC entity, should be considered to determine whether BSRs should be cancelled. If the UL grants in the current subframe can accommodate all pending data available for transmission but is not sufficient to accommodate the BSRs, the BSRs triggered by the corresponding MAC entity and by BSR handler 842 should be cancelled while the BSRs triggered by other MAC entities should not be affected. UE 801 monitors and detects BSR trigger events. If MAC entity 851 or BSR handler 841 determines BSR reporting is needed, at step 861, UE 801 sends a BSR to BS 802. At step 862, BS 802 replies to UE 801 with UL grants. If MAC entity 852 or BSR handler 841 determines BSR reporting is needed, at step 863, UE 801 sends a BSR to BS 803. At step 864, BS 803 replies to UE 801 with UL grants.

In one embodiment, a BSR is triggered by BSR handler 841 if higher priority data arrives or the BSR retransmission timer expires. A BSR is triggered by a corresponding MAC entity if the BSR periodic timer expires or padding spaces becomes available to accommodate the BSR.

Figure 9:
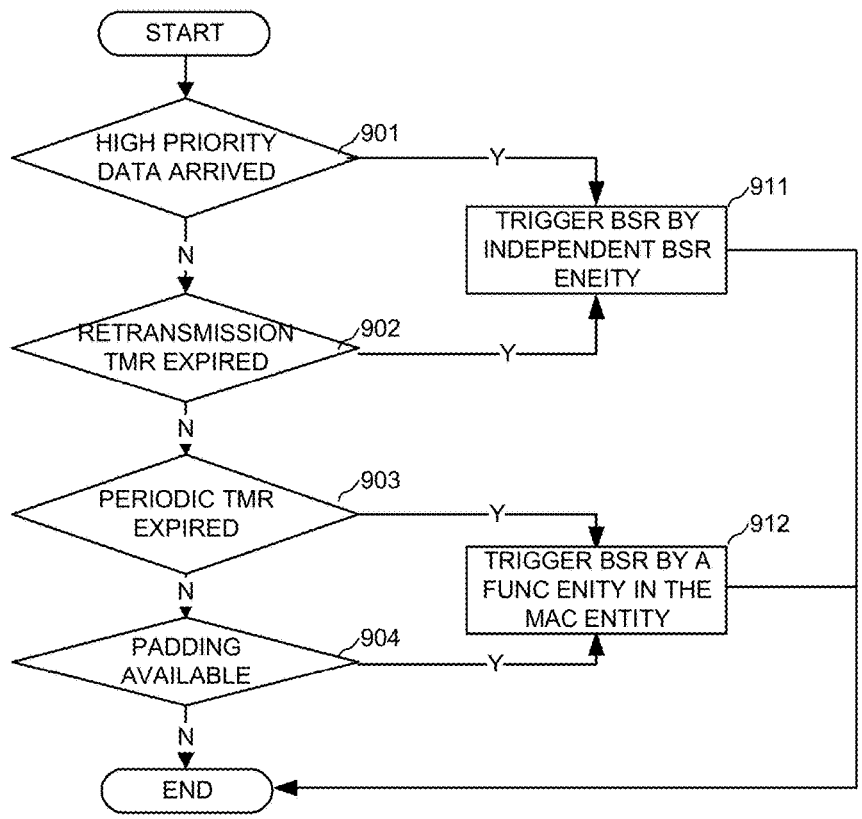
FIG. 9 is a flow diagram of a UE transmitting BSR to multiple base stations using hybrid BSR.

FIG. 9 is a flow diagram of a UE transmitting BSR to multiple base stations using hybrid BSR. At step 901, the UE determines if high priority data arrived. If step 901 determines yes, the UE moves to step 911 to set the BSR trigger by BSR handler 841. If step 901 determines no, the UE moves to step 902. At step 902, the UE determines if the BSR retransmission timer expired. If step 902 determines yes, the UE moves to step 911 to set the BSR trigger by BSR handler 841. If step 902 determines no, the UE moves to step 903. At step 903, the UE determines if the BSR periodic timer expired. If step 903 determines yes, the UE moves to step 912 to set the BSR trigger by a corresponding MAC entity. If step 903 determines no, the UE moves to step 904. At step 904, the UE determines is there is padding space available to accommodate the BSR. If step 904 determines yes, the UE moves to step 9112 to set the BSR trigger by a corresponding MAC entity. If step 904 determines no, the UE terminates the procedure.

BS Selection

When a UE is configured with inter-base station carrier aggregation, the UE needs to select which base station to send the BSR. In general, if the UL resources allocated for new transmission are granted from one BS, the BSR will be transmitted to the BS that grants the UL resource. If the UL resources allocated for new transmission are granted from more than one BS, there are several methods to send the BSR.

In one embodiment of the current invention, one base station is selected to receive the BSR. The criteria to select the base station may include the base station responsible for a traffic loading, the base station having better channel quality, the base station to which a scheduling request has been transmitted, and the base station granting the UL resources that can accommodate BSR with full buffer status information. Upon selecting a base station to transmit the BSR, the UE calculates the buffer status value for the BSR reporting.

Figure 10:
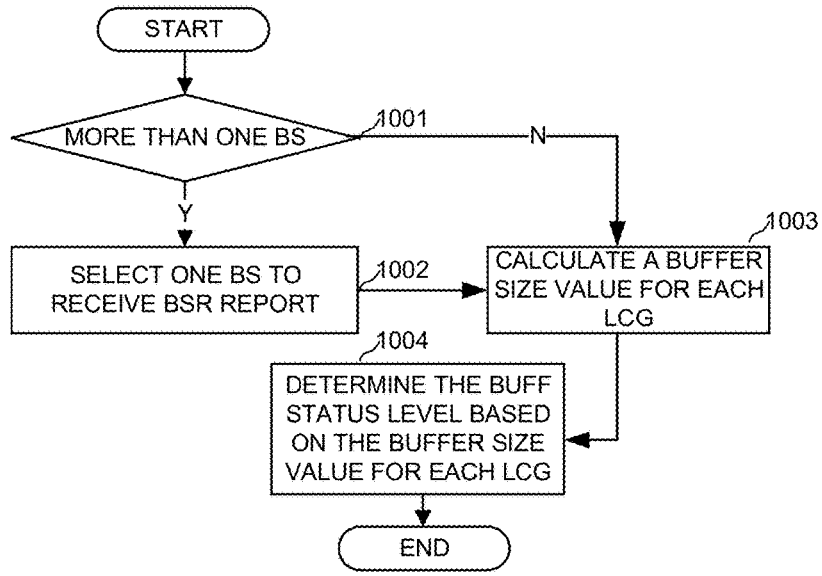
FIG. 10 is an exemplary flow diagram of a UE calculating the buffer status value for BSR in accordance with embodiments of the current invention.

FIG. 10 is an exemplary flow diagram of a UE calculating the buffer status value for BSR in accordance with embodiments of the current invention. At step 1001, the UE determines if the PDUs that would accommodate the BSR can be generated by more than one MAC entities. If step 1001 determines yes, the UE moves to step 1002. At step 1002, the UE select one base station to send the BSR report and moves to step 1003. If step 1001 determines no, the UE moves to step 1003 directly. At step 1003, the UE calculates the buffer size value for each LCG after all MAC PDUs have been built for this TTI. At step 1004, the UE determines the buffer status value based on the buffer size value for each LCG.

In one novel aspect of the current invention, BSRs are sent to different base stations. In one embodiment, the BSRs are sent to different base stations with the same contents, where each LCG reports one buffer status value TTI. This buffer status value is the same for all BSRs reporting for the same LCG. In another embodiment, the BSRs are sent to different base stations with different contents.

Figure 11:
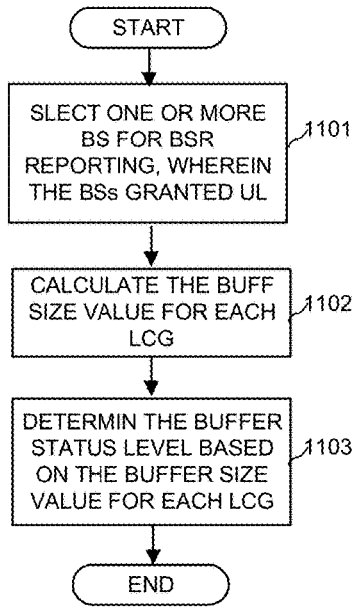
FIG. 11 is an exemplary flow diagram of a UE calculating buffer status value for separate BSRs to different base stations with the same contents.

FIG. 11 is an exemplary flow diagram of a UE calculating buffer status value for separate BSRs to different base stations with the same contents. At step 1101, the UE selects one or more BSs for BSR reporting which has granted UL resources that can accommodate the BSR. At step 1102, the UE calculates the buffer size value for each LCG after all MAC PDUs have been built for this TTI. At step 1103, the UE determines the buffer status level based on the buffer size value for each LCG.

In other embodiments, the UE builds different buffer status values for the selected different base stations. In one embodiment, each LCG reports at most one buffer status value per TTI. Different LCG may report different buffer status values. The buffer status value of each LCG is reported in all BSRs containing this LCG to the corresponding BS. For example, assuming there are four LCGs available at the UE side, LCG1, LCG2, LCG3 and LCG4 and two BSs are configured to provide service to the UE. BS1 is responsible for UL resource allocation of LCG1 and LCG2, while BS2 is responsible for UL resource allocation of LCG3 and LCG4. BSR for LCG1 and LCG2 will be reported to BS1, and BSR for LCG3 and LCG4 will be reported to BS2.

In another embodiment, the BSR reports to different base stations have different contents. Each LCG can report more than one buffer status value per TTI. The sum of the values for each LCG reflects the overall buffer status of the LCG after all MAC PDUs have been built for this TTI. The buffer status value for each LCG is split into several parts and sent to different base stations. In one embodiment, the sum of buffer status value for each LCG is split according to a preconfigured load ratio among different BSs.

Figure 12:
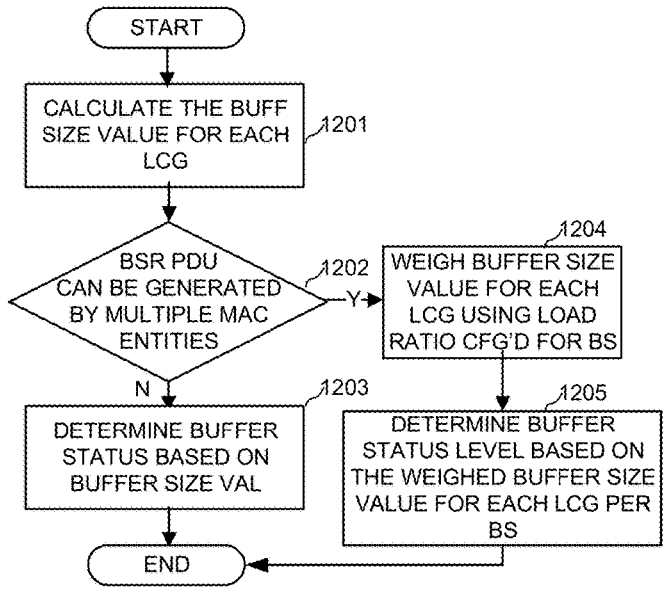
FIG. 12 is an exemplary flow diagram of a UE calculating buffer status value for separate BSRs to different base stations with the different contents.

FIG. 12 is an exemplary flow diagram of a UE calculating buffer status value for separate BSRs to different base stations with the different contents based on load ratio among different BSs. At step 1201, the UE calculates the buffer size value for each LCG. At step 1202, the UE determines if the PUD that can accommodate the BSR can be generated by more than one MAC entities. If step 1202 is no, the UE moves to step 1203 to determine the buffer status level based on the buffer size value for each LCG and ends the procedure. If step 1202 is yes, the UE moves to step 1204 to weigh the buffer size value for each LCG with the load ratio configured for different BSs. The UE then moves to step 1205 to determine the buffer status level based on the weighted buffer size value for each LCG per base station.

Other ways to split the buffer status value for each LCG is based on the configurations of LCs and LCGs. Using this method, the LCs in each LCG are partitioned into several sets without overlapping. The BSRs corresponding to different BSs embody the total buffer status of each partitioned LC set. For example, LCG 1 contains LC1, LC2, LC3 and LG4. When BSR can be reported to BS1 and BS2 in the same TTI, BSR for LCG1 considering LC1 and LC2 can be reported to BS1 and BSR for LCG1 considering LC3 and LC4 can be reported to BS2. If the number of padding bits in a PDU can only accommodate partial of the buffer status information, the contained BSR will not provide full buffer status information to the network.

Budget BSR

In one novel aspect, budget BSR is used to provide BSR reports to one or more selected base stations. Initially, UE transmits UL data to only one eNB/base station. The BSR is provided to the eNB/base station for UL scheduling. The Budget BSR enables the UE to inform a different eNB when the UL load budget on the original eNB has reached its limit and more UL radio resources are required. For example, when the total amount of UL data or UL data for a logical channel in a LCG available for transmission reaches a predefined threshold, the Budget BSR is triggered. The UE reports the event to a different eNB. In one embodiment, the UE only reports the relative buffer status value, indicating the difference between the current buffer status and the BSR budget. A periodic timer and a retransmission timer are used to control the budget BSR reporting behavior. In one example, the normal BSR is performed by one MAC entity while the Budget BSR is performed by another MAC entity.

Figure 13:
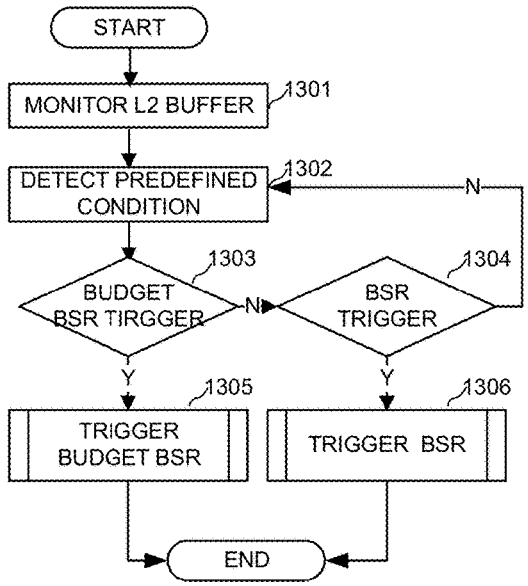
FIG. 13 is an exemplary flow diagram of a UE providing BSR and Budget BSR to different base stations with separate MAC entities based on BSR and Budget BSR triggering and reporting.

FIG. 13 is an exemplary flow diagram of a UE providing BSR and Budget BSR to different base stations with separate MAC entities based on BSR and Budget BSR triggering and reporting. At step 1301, the UE monitors layer two buffers. At step 1302, the UE detects the occurrence of one or more predefined conditions. At step 1303, the UE determines if a Budget BSR triggering event occurred. If step 1303 determines no, the UE moves to step 1304 to determine if a BSR triggering event occurred. If step 1304 determines no, the UE moves back to step 1302 to monitor and determine if one or more predefined conditions are met. If step 1304 determines yes, the UE moves to step 1306 and triggers regular BSR. If step 1303 determines yes that a Budget BSR triggering event occurred, the UE moves to step 1305 to perform a Budget BSR.

Once a Budget BSR process is triggered, the UE performs the budget BSR procedures similar to the process laid out in FIG. 4. The steps for a Budget BSR may include calculating the available space of the transmitting PDUs based on the allocated UL resources, determining whether the available space of the PDUs to be transmitted can additionally accommodate the Budget BSR, calculating the relative buffer status for each LCG after all MAC PDUs have been built for this TTI, selecting the PDUs in which the Budget BSR will be included, instructing the Multiplexing and Assembly procedure to generate the PDU(s) for Budget BSR, transmitting the PDU(s) containing Budget BSR to the BS, starting or restarting Budget BSR periodic timer when all the generated Budget BSR can provide full buffer status information, starting or restarting Budget BSR retransmission timer, and cancelling all triggered Budget BSRs in the corresponding MAC entity. If the UL grant(s) received by the MAC entity in this subframe can accommodate all pending data available for transmission but is not sufficient to additionally accommodate the Budget BSRs, all triggered Budget BSR by the MAC entity and the BSR triggered by the independent function entity shall be cancelled. The Budget BSR procedure follows the steps for a regular BSR as in FIG. 4. For Budget BSR, a base station is selected first to receive the Budget BSR report. Therefore, the Budget BSR is performed by the corresponding BSR handling entity based on the selected base station to receive the Budget BSR.

In one embodiment, the Budget BSR is triggered when one or more predefined UL data condition of is satisfied. The predefined conditions may include (a) the total amount of UL data for all logical channels which belong to the LCGs becomes available for transmission in the RLC entity or in the PDCP entity reaches to certain threshold, (b) UL data, for a logical channel which belongs to a LCG, becomes available for transmission in the RLC entity or in the PDCP entity reaches to certain threshold, (c) the total amount of UL data for a LCGs becomes available for transmission in the RLC entity or in the PDCP entity reaches to certain threshold, (d) the total amount of UL data for all logical channels which belong to the LCGs becomes available for transmission in the RLC entity or in the PDCP entity has reached to certain threshold for a period of time, (e) UL data, for a logical channel which belongs to a LCG, becomes available for transmission in the RLC entity or in the PDCP entity has reached to certain threshold for a periodic of time, and (f) the total amount of UL data for a LCG becomes available for transmission in the RLC entity or in the PDCP entity reaches to certain threshold for a period of time. The Budget BSR may also triggered if the Budget BSR retransmission timer expires, or the Budget BSR periodic timer expires, or there is padding space available in any UL shared channel (UL-SCH) through the Budget BSR MAC entity. The values of the periodic timer and retransmission timer can be redefined or preconfigured. The Budget BSR triggering threshold value can be predefined or preconfigured as well. The values for these parameters, the timers and the threshold, can be configured or defined to be same for all MAC entities or be different. It is understood by ordinary skills in the art that the UE monitors and detects predefined conditions to determine whether to trigger a budget BSR procedure. For implementations, the logic in the UE can check the Budget BSR conditions first. If budget BSR conditions are not detected, the UE moves on to check regular BSR conditions.

Figure 14:
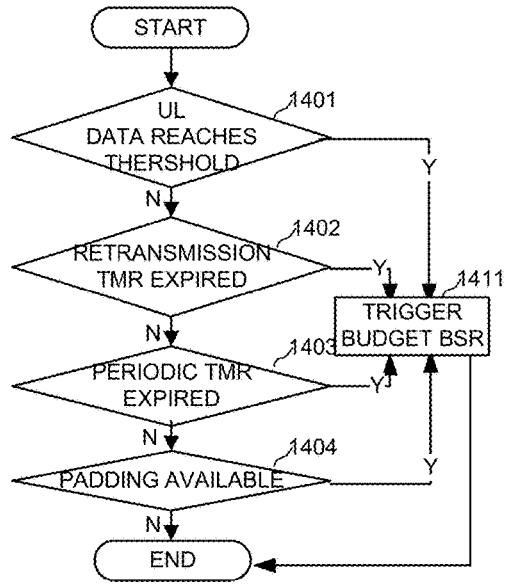
FIG. 14 is an exemplary flow diagram of a UE triggering a Budget BSR in accordance with embodiments of the invention.

FIG. 14 is an exemplary flow diagram of a UE triggering a Budget BSR in accordance with embodiments of the invention. At step 1401, the UE determines if an predefined UL data condition reaches a predefined threshold as discussed above. If step 1401 determines yes, the UE moves to step 1411 to set the Budget BSR trigger. If step 1401 determines no, the UE moves to step 1402. At step 1402, the UE determines if the Budget BSR retransmission timer expired. If step 1402 determines yes, the UE moves to step 1411 to set the Budget BSR trigger. If step 1402 determines no, the UE moves to step 1403. At step 1403, the UE determines if the Budget BSR periodic timer expired. If step 1403 determines yes, the UE moves to step 1411 to set the BSR trigger. If step 1403 determines no, the UE moves to step 1404. At step 1404, the UE determines is there is padding space available to accommodate the BSR. If step 1404 determines yes, the UE moves to step 1411 to set the BSR trigger. If step 1404 determines no, the UE terminates the procedure.

To further reduce the overhead of the BSR reporting and make the system more efficient, no-data-indication is sent to signal the network. The no-data-indication procedure is triggered if one or more predefined conditions are met. The predefined conditions include the amount of data available for transmission is below a threshold, the amount of data transmission is below a threshold for a period, and the last byte of the data available for transmission is transmitted. In general, when the UE expects no data or only a small amount of data for transmission, or for a period of time only a certain amount of small data is available for transmission, the UE sends an indication to one or more base stations such that no UL grants are needed. The indication can be sent through RRC signaling, MAC CE, such as zero BSR on UL-SCH, or through UCI on PUCCH.

Figure 15:
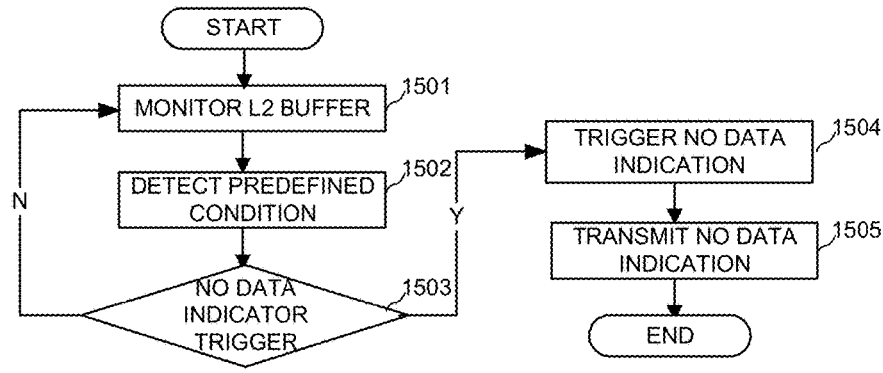
FIG. 15 is an exemplary flow diagram of a UE sending a no-data-indication to one or more base stations in accordance with embodiments of the current invention.

FIG. 15 is an exemplary flow diagram of a UE sending a no-data-indication to one or more base stations in accordance with embodiments of the current invention. At step 1501, the UE monitors layer two buffer. At step 1502, the UE detects one or more predefined conditions. At step 1503, the UE determines if one or more no-data-indication trigger events occurred. If step 1503 determines no, the UE moves back to step 1501 to continue monitor the layer two buffer. If step 1503 determines yes, the UE moves to step 1504. At step 1504, the UE triggers the no-data-indication procedure. At step 1505, the UE transmits a no-data-indication to the network.

Figure 16:
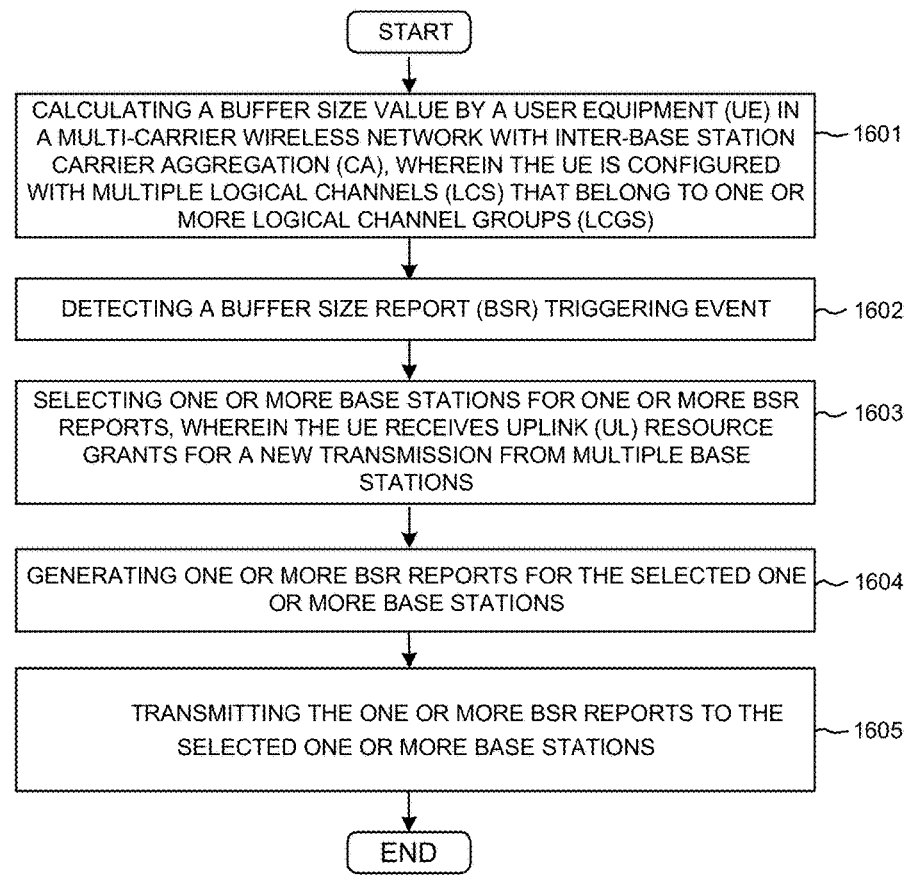
FIG. 16 is a flow diagram of a UE selecting one or more base station to send one or more BSR reports in accordance with embodiments of the current invention.

FIG. 16 is a flow diagram of a UE selecting one or more base station to send one or more BSR reports in accordance with embodiments of the current invention. At step 1601, the UE calculates a buffer status value by a UE in a multi-carrier wireless network with inter-base station carrier aggregation (CA), wherein the UE is configured with multiple LCs that belong to one or more LCGs. At step 1602, the UE detects a BSR triggering event. At step 1603, the UE selects one or more base stations for one or more BSR reports, wherein the UE receives uplink (UL) resource grants for a new transmission from multiple base stations. At step 1604, the UE generates one or more BSR reports for the selected one or more base stations. At step 1605, the UE transmits the one or more BSR reports to the selected one or more base stations.

Figure 17:
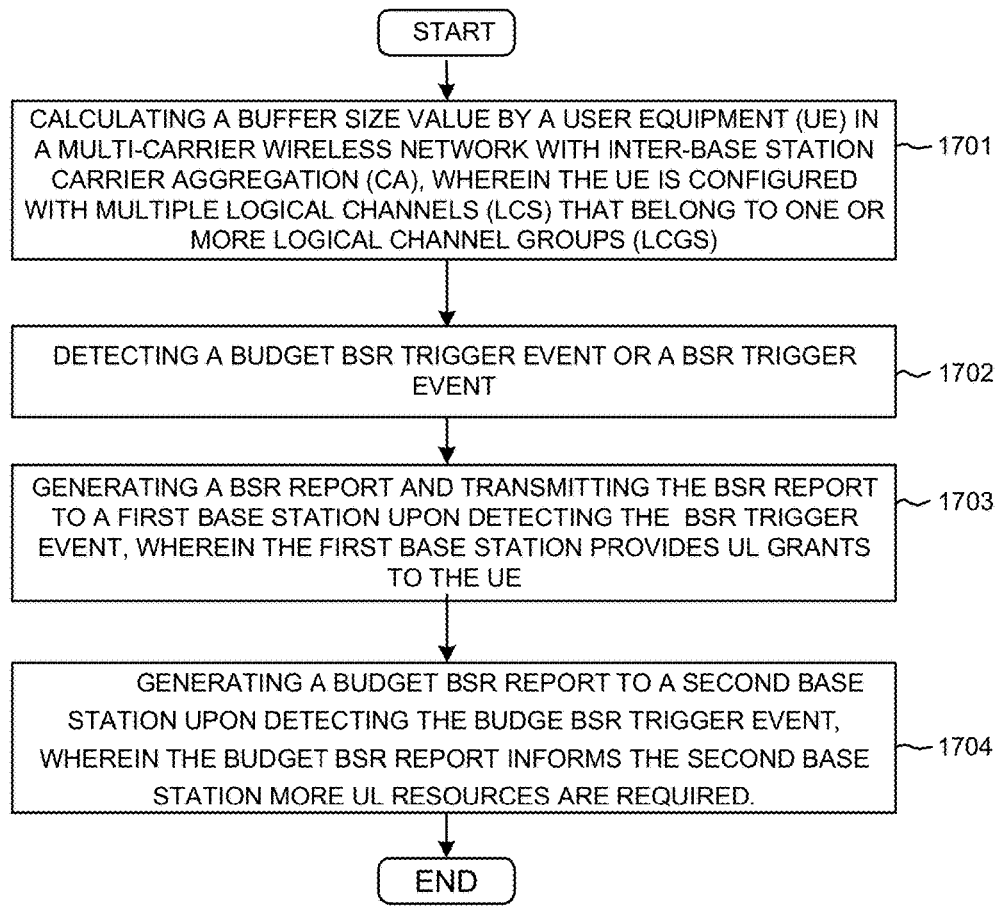
FIG. 17 is a flow diagram of a UE performs Budget BSR procedure in accordance with embodiments of the current invention.

FIG. 17 is a flow diagram of a UE performs Budget BSR procedure in accordance with embodiments of the current invention. At step 1701, the UE calculates a buffer status value by a UE in a multi-carrier wireless network with inter-base station carrier aggregation (CA), wherein the UE is configured with multiple LCs that belong to one or more LCGs. At step 1702, the UE detects a budget BSR trigger event or a BSR trigger event. At step 1703, the UE generates a BSR report and transmitting the BSR report to a first base station upon detecting a BSR trigger event, wherein the first base station provides UL grants to the UE. At step 1704, the UE generates a budget BSR report to a second base station upon detecting a budge BSR trigger event, wherein the budget BSR report informs the second base station more UL resources are required.

Avoiding Resource Over-Allocation

Since multiple schedulers residing in different eNBs are responsible for the UL radio resource allocation to a UE, the schedulers performs the UL scheduling in a relatively independent way assuming that very infrequent and limited information related to the UE buffer status would be exchanged between them. After UE reports its buffer status to one scheduler, it is very likely that UL grants will be received from other schedulers before the reported BSR is responded by the corresponding scheduler. So the reported BSR is actually out-dated. Currently, UE doesn't have any opportunities to update its buffer status information to the scheduler if other UL grants are received from other schedulers later on. So the case of over-allocation of UL radio resources will occur very frequently due to the lack of non-updated buffer status information.

One optimized method is that a variable for each scheduler is used which holds the value of the data amount which has not been satisfied by the scheduler based on the reported BSR. It serves as the data amount, which is expected to be transmitted through the UL resources after a BSR, has been reported. The variable corresponding to a scheduler is the difference between the reported BSR and the data amount, which has been accommodated by the UL radio resources granted. When a BSR is reported, the variable is replaced by the latest BSR value reported. It is updated whenever a UL grant is received from the scheduler and certain amount of buffered data is transmitted. It is updated to value for remaining data which has been satisfied by the scheduler. In this invention, the variable for each scheduler is named as UDA (Unsatisfied data amount).

It is possible that even a BSR is reported to a scheduler, the data amount can't be satisfied by the scheduler due to some reasons, e.g. lack of UL radio resources. In order to avoid UE waiting for the UL grants from the scheduler and making the reported data amount stuck in the buffer for a long period, a timer is used to control how long the UE considers the reported BSR should be satisfied by the scheduler. The variable corresponding to a scheduler is set to zero upon expiry of the timer. The timer is started or re-started upon transmission of a new BSR except when all the generated BSRs are Truncated BSRs. In one embodiment of this invention, the method of BSR calculating and reporting comprises the following steps, assuming the number of schedulers is N. $UDA_i$ stands for the unsatisfied data amount corresponding to the scheduler i; $BS_i$ stands for the buffer size, which will be reported to the scheduler i; $UGA_i$ stands for the amount of data which is available for transmission in the Layer two buffer and will be accommodated by the UL grants received from scheduler i; CBS, i.e. current buffer size stands for the buffer size after all MAC PDUs have been built for this TTI. i=0, 1 . . . N−1

Step one: Initialize $UDA_i=0$, $BS_i=0$;
Step two: When UL grant(s) are received from scheduler i, calculate $UGA_i$, and update $UDA_i$ to $UDA_i=UDA_i-UGA_i$, and if $UDA_i<=0$, set $UDA_i$ to 0;
Step three: When BSR has been triggered and would be generated and reported to scheduler i, calculate CBS and $BS_i$ where $$BS_i = CBS - \sum_{j=0, j\neq i}^{N-1} UDA_j;$$

Step four: Update $UDA_i=BS_i$;
Step five: Report BSR to scheduler i based on $BS_i$.
Step six: Start or restart the timer corresponding to scheduler i.

If the UL resources allocated for new transmission are granted from more than one BS, there are several methods to deal with the case. One method is that UE selects one scheduler to which the BSR is reported. So step three is performed directly, so $$BS_i = CBS - \sum_{j=0, j \neq i}^{N-1} UDA_j.$$

One method is that UE reports multiple BSRs to different schedulers respectively. So the BS value to each scheduler is calculated based on $$BS_i = CBS - \sum_{j=0, j \neq i}^{N-1} UDA_j$$

Figure 18:
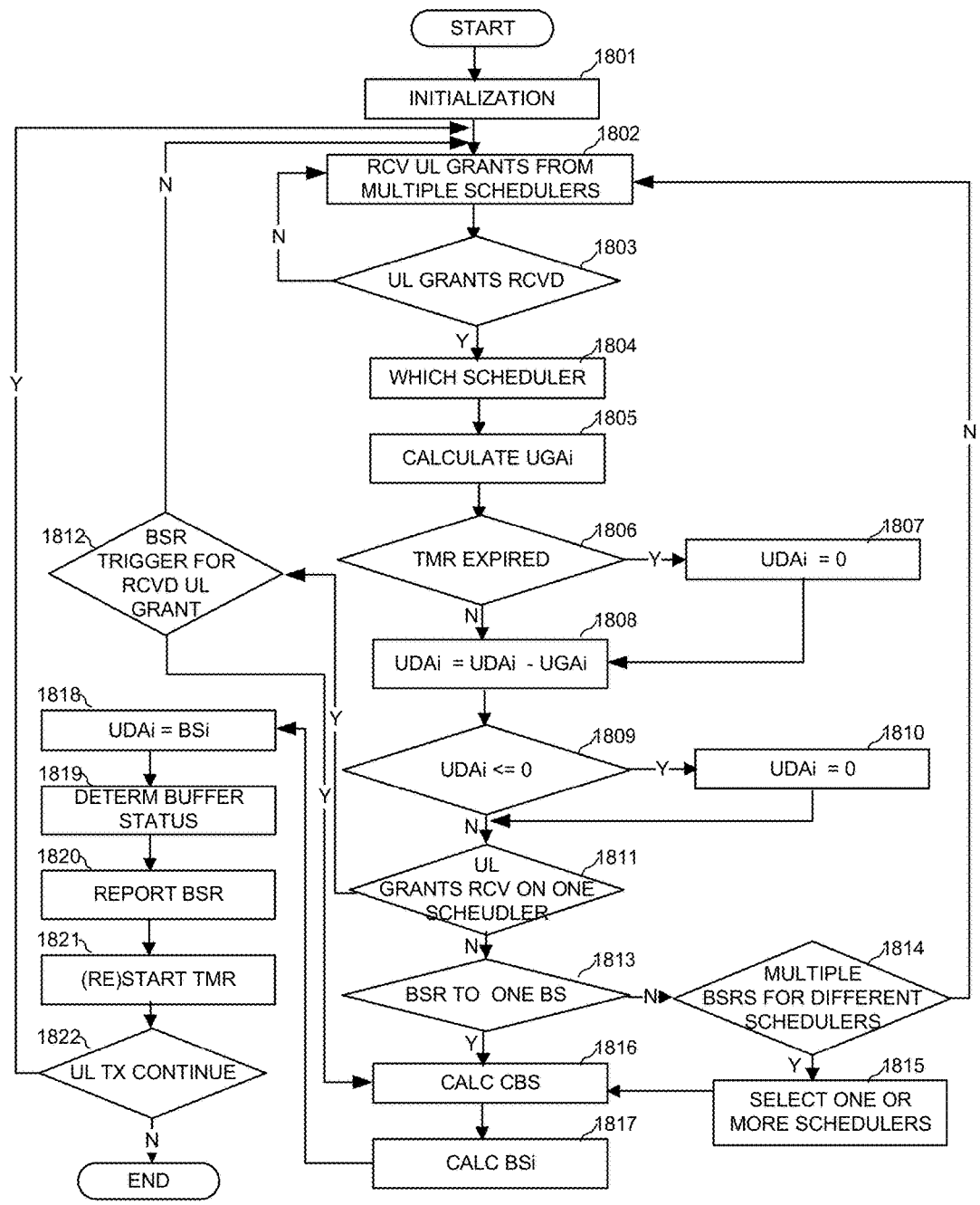
FIG. 18 is an exemplary flow diagram of a UE transmitting BSRs to different BSs implementing avoidance of radio resource over-allocation.

FIG. 18 is an exemplary flow diagram of a UE transmitting BSRs to different BSs implementing avoidance of radio resource over-allocation. After inter-eNB is configured for the UE and UE is ready for UL data transmission to the activated serving cells originating from different eNBs, UE begins to monitor PDCCH for UL resource allocation granted from different eNBs and performs UL data transmission accordingly. At step 1801, the UE first initializes the variables UDA$_i$, BS$_i$ to zero for each scheduler. At step 1802, the UE receives UL grants from multiple schedulers. At step 1803, the UE determines if UL grants are received. If step 1803 determines no, the UE moves back to step 1802. If step 1803 determines yes, the UE moves step 1804 and determines from which scheduler each UL grants are received. At step 1805, based on the UL grants, the UE calculates the amount of data that is available for transmission in the UL buffer and can be accommodated by the UL grants received from each scheduler, i.e. UGA$_i$. At step 1806, the UE checks whether the timer expires or not. If the timer expires, the UE moves to step 1807, where UDA$_i$ is set to zero. Then UE moves to step 1808 and updates UDA$_i$ to UDA$_i$–UGA$_i$ for each scheduler where UL grant(s) are received. If step 1806 determines that the timer did not expire, the UE moves to step 1808 directly and updates UDA$_i$ to UDA$_i$–UGA$_i$ for each scheduler where UL grant(s) are received. At step 1809 the UE determines if UDA$_i$<=0, If step 1809 determines yes, the UE, at step 1810, sets UDA$_i$ to be zero and moves to step 1811. If step 1809 determines no, the UE moves to step 1811 directly. At step 1811, the UE determines if the UL grants are received from only one scheduler. If step 1811 determines yes, the UE moves to step 1812 to determine whether BSR has been triggered for it. If step 1812 determines that BSR has been triggered, the UE will move to step 1816 to prepare to report BSR to the scheduler. If step 1812 determines no, the UE moves back to step 1802. If step 1811 determines that UL grants are received from more than one scheduler, the UE moves to step 1813 to determine whether multiple BSRs intended to only one scheduler where UL grants are received have been triggered respectively. If step 1813 determines no, the UE moves to step 1814. At step 1814, the UE determines if multiple BSRs are for different schedulers. If so, the UE selects one scheduler to which BSR will be reported. Otherwise, UE will report BSR to the scheduler for which BSR has been triggered. After UE determines to which scheduler the BSR will be reported, the UE moves step 1816 to prepare to report the BSRs. At step 1816, the UE calculates current buffer status after all MAC PDUs have been built in the TTI. Then at step 1817, the UE calculates BS$_i$ for the scheduler, which equals to $$BS_i = CBS - \sum_{j=0, j \neq i}^{N-1} UDA_j.$$

At step 1818, the UE updates UDA$_i$ to BS$_i$. At step 1819, the UE determines the buffer status. At step 1820, the UE reports BSR to the scheduler based on the value of BS$_i$. At step 1821, the UE starts or restarts the timer. At step 1822, the UE determines if UL transmission continues. If step 1822 determines yes, the UE moves back to step 1802. If step 1822 determines no, the UE terminates the procedure.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
    calculating a buffer status value by a user equipment (UE) in a multi-carrier wireless network with inter-base station carrier aggregation (CA), wherein the UE is configured with multiple logical channels (LCs) that belong to one or more logical channel groups (LCGs);
    associating a first MAC entity with a first base station;
    associating a second MAC entity with a second base station;
    detecting a buffer status report (BSR) triggering event;
    selecting one or more base stations of the first base station and the second base station for more BSR reports, wherein the UE receives uplink (UL) resource grants for a new transmission from one or more base stations of the first base station and the second base station;
    generating one or more BSR reports for the selected one or more base stations; and
    transmitting the one or more BSR reports to the selected one or more base stations.

2. The method of claim 1, wherein one base station is selected to receive the one or more BSR reports, and wherein the base station is selected based one or more criteria comprising: the base station is responsible for traffic offloading, the base station has better channel quality than a threshold, the base station receives scheduling request (SR) before, and the base station grant UL resources that can accommodate the full buffer status requirement by the UE.

3. The method of claim 1, wherein more than one base stations are selected to receive BSR reports.

4. The method of claim 3, wherein the same BSR report is generated for all base stations from which the UE receives UL grants.

5. The method of claim 3, wherein different BSR reports are generated for different base stations from which the UE receives UL grants.

6. The method of claim 5, wherein multiple BSR reports are generated for each LCG to be sent to different base stations, and wherein the full buffer status value for the LCG is split to the multiple BSR reports according to a predefined or preconfigured load ratio of corresponding base stations.

7. The method of claim 5, wherein multiple BSR reports are generated for each LCG, and wherein each BSR report is generated for a preconfigured non-overlapping subset of LCs in a LCG, and wherein each preconfigured subset of LCs relate to the same base station.

8. The method of claim 1, further comprising:
updating the buffer status value upon receiving a UL grant or a portion of buffered data is transmitted.

9. The method of claim 1, wherein the triggering events comprising: arrival of high priority data, expiration of a periodic timer for BSR, UL data amount reaches a pre-defined threshold, expiration of a BSR retransmission timer, and padding space in a PDU becomes available.

10. A user equipment (UE) comprising:
a radio frequency (RF) transceiver that transmits and receives radio signals from multiple base stations in a wireless network;
a first MAC entity, wherein the first MAC entity is associated with a first base station;
a second MAC entity, wherein the second MAC entity is associated with a second base station; and
a processor that calculates a buffer status value of the UE, configures multiple logical channels (LCs) that belong to one or more logical channel groups (LCGs), wherein at least a first LC relates to the first base station and at least a second LC relates to the second base station, detects BSR trigger events, selects one or more base stations for one or more BSR reports, wherein the UE receives UL resource grants for a new transmission from the one or more base stations, and generates one or more BSR reports.

11. The UE of claim 10, wherein the processer selects one base stations for a BSR reporting.

12. The UE of claim 10, wherein the processer selects multiple base stations for a BSR reporting.

13. The UE of claim 12, wherein the same BSR report is generated for all the base stations from which the UE receives UL grants.

14. The UE of claim 12, wherein different BSR reports are generated for different base stations from which the UE receives UL grants.

15. The UE of claim 13, wherein a BSR report is generated by the BSR generation module independent of the first MAC entity and the second MAC entity.

16. The UE of claim 13, wherein two BSR reports are generated by the BSR generation module, and wherein a first BSR is associated with the first MAC entity and a second BSR is associated with the second MAC entity.

17. The UE of claim 10, wherein one or more BSR reports are generated by the BSR generation module if the BSR detection module detects trigger events comprises: expiration of BSR periodic timer relating to the first or the second MAC entity, and padding space is available in the PDU relating to the first or the second MAC entity.

* * * * *